United States Patent [19]

West, III

[11] 4,032,699

[45] June 28, 1977

[54] FLUID RESISTANT TERPOLYMER COMPOSITIONS

[75] Inventor: Arthur C. West, III, St. Paul, Minn.

[73] Assignee: Minnesota Mining and Manufacturing Company, St. Paul, Minn.

[22] Filed: Sept. 15, 1975

[21] Appl. No.: 613,225

[52] U.S. Cl. .............................. 526/18; 428/522; 526/27; 526/249
[51] Int. Cl.² ...................................... C08F 214/22
[58] Field of Search ............ 260/80.77; 526/18, 27, 526/249

[56] References Cited

UNITED STATES PATENTS

| | | | |
|---|---|---|---|
| 3,053,818 | 9/1962 | Honn et al. | 260/80.77 |
| 3,686,143 | 8/1972 | Bowman | 260/80.77 |
| 3,712,877 | 1/1973 | Patel et al. | 260/80.77 |
| 3,790,540 | 2/1974 | Dohany et al. | 260/80.77 |

*Primary Examiner*—Harry Wong, Jr.
*Attorney, Agent, or Firm*—Cruzan Alexander; Donald M. Sell; Temple Clayton

[57] ABSTRACT

Thermally stable, fluoroelastomeric terpolymers of vinylidene fluoride, hexafluoropropene and chlorotrifluoroethylene in respective mol % composition of 55–70, 25–40 and 1–8 produce vulcanizates with improved fluid resistant properties and low temperature flexibility.

5 Claims, No Drawings

FLUID RESISTANT TERPOLYMER COMPOSITIONS

This invention relates to fluoroelastomers and particularly to terpolymers of vinylidene fluoride, hexafluoropropene and chlorotrifluoroethylene and particularly to terpolymers containing very limited amounts of chlorotrifluoroethylene.

Terpolymers of these three monomers are known from Honn et al. U.S. Pat. No. 3,053,818 in which there is required to be at least 15 mol percent of chlorotrifluoroethylene. A rubbery polymer is obtained which is reported to contain, e.g., in mol percent, 38% vinylidene fluoride, 13% per fluoropropene and 49% chlorotrifluoroethylene. Although not so described the presence of proportions of chlorotrifluoroethylene above about 15 mol percent results in relatively poor solvent resistance.

Other terpolymeric elastomers including vinylidene fluoride are known in which pentafluoropropene or hexafluoropropene are employed together with tri- or tetrafluoroethylene as noted in U.S. Pat. Nos. 2,968,649, 3,335,106 and 3,790,540. It is believed that generally the stability of fluoropolymers decreases as the hydrogen content increases and accordingly it is desirable to produce elastomers having decreased carbon-bonded hydrogen content.

Nonelastomeric copolymers of hexafluoroisobutylene and vinylidene fluoride containing from about 0.1 to 30 mol percent of $C_2F_4$ or $C_2F_3Cl$ or mixtures thereof are known from U.S. Pat. No. 3,893,987.

Fluoroelastomers are commercially used in a wide variety of structural and sealant applications despite their high cost. Their outstanding characteristic is the unique combination of stability at elevted temperature and resistance to swelling or attack by solvents. To be useful, such elastomers must be capable of cure (i.e., vulcanization or crosslinking) to compositions having acceptable tensile strength, elongation and resistance to compression set, tear and abrasion. These characteristics should be retained in large part for extended periods of time at high temperatures and pressures in the presence of solvents.

Certain uses, particularly as O-rings, gaskets, and shaft seals in automotive and aircraft applications, require the material to be elastomeric at low temperatures, e.g. below 0° C., because such temperatures are commonly encountered under conditions of operation and, particularly, storage. Unfortunately, compositional modifications of the conventional vinylidene fluoride/perfluoropropene copolymers to improve one or more of these desirable characteristics has heretofore resulted in undesirable deterioration in other properties.

It has been found that a valuable class of terpolymers, which vulcanize or cure to elastomeric materials having good balance of solvent resistance and of low temperature properties without loss of desirable properties such as low compression set and high temperature stability, is obtained by copolymerizing vinylidene fluoride ($VF_2$) hexafluoropropene (HFP) and chlorotrifluoroethylene (CTFE) in molar proportions totalling 100 mol percent of about 55 – 70, 25 – 40 and 1 – 8 mol percent respectively and preferably in proportions of 55 – 65, 30 – 40 and 1 – 5 mol percent respectively.

It will be understood that a terpolymer described as consisting essentially of these monomers actually is made up of moieties having the same skeletal structures as these monomers as repeating units in the polymer backbone. Thus hexafluoropropene ($C_3F_6$) provides repeating units.

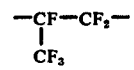

An unusual and unexpected feature of the polymerization system of the present invention is that in the presence of these relatively small proportions of chlorotrifluoroethylene, i.e., 1 – 8 mol percent, the polymerization of hexafluoropropene is promoted so that the terpolymers tend to contain less hydrogen then would be expected with the conventional copolymer system. Terpolymers of the invention are macromolecules of number average molecular weight from possibly as low as 1,000 upward to 1,000,000 or more.

The terpolymers of the present invention are preferably prepared by carrying out the polymerization reaction in the presence of a free-radical promoter as will be evident from the following examples. For example, the polymerization reaction is carried out by employing a water-soluble peroxy type initiator in a water-suspension type recipe or an organic peroxide initiator in a bulk-type system. The water-suspension type recipe system is preferred.

The water-suspension type system contains a water-soluble peroxy-type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt such as ferrous sulfate or ferrous nitrate to accelerate the copolymerization reaction. The water-soluble initiator present in the water-suspension type recipe system comprises between about 0.1 and about 5 parts by weight per 100 parts of total monomers present. The variable-valence metal salt, if used, is preferably employed in an amount between about 0.01 and about 0.2 part by weight per 100 parts of total monomers present. It is also desirable, in some instances, in these water-suspension type recipe systems, that a reductant be present, preferably in the form of a bisulfate, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In these water-suspension type recipe systems, it is often desirable to employ an emulsifying agent. This emulsifying agent is present either in the form of a metallic salt of an aliphatic acid having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acid or salts thereof, serving as emulsifying agents in the above-mentioned water-suspension type recipe systems, are polyfluorocarboxylic acids (e.g., perfluorooctanoic acid) or perfluorochlorocarboxylic acid salts (e.g., trifluorochloroethylene telomer acid soaps). The polyfluorocarboxylic acids which may be employed are such as those disclosed in U.S. Pat. No. 2,559,752; and the non-acidic derivatives of the acids disclosed therein as being effective dispersing agents may also be used in the process of the present invention. Perfluorochlorocarboxylic acid salts which may be used in accordance with this invention include those disclosed in U.S. Pat. No. 2,806,867 as being useful dispersing agents in polymerization reactions. In general, these emulsifying agents are present in an amount between about 0.1 and about 5 parts by weight per 100 parts of total monomers present.

The polymerization reaction is preferably conducted under essentially neutral conditions. It is desirable, therefore, that the pH be maintained between about 5 and 8. In this respect, it should be noted that it is sometimes necessary to maintain the pH of the system within the aforementioned pH limits by the addition of suitable buffer agents such as $K_2HPO_4$.

As indicated above, the polymerization reaction may also be carried out with the initiator being present in the form of an organic peroxide in a bulk-type polymerization system. Of these organic peroxide promoters, halogen-substituted peroxides are most desirable. A preferred promoter of this type is perfluorobutyryl peroxide. Other halogen-substituted organic peroxides for carrying out the polymerization reaction are trifluorodichloropropionyl peroxide, trifluoroacetyl peroxide, difluoroacetyl peroxide, trichloroacetyl peroxide, 2,4-dichlorobenzoyl peroxide and dichloroacetyl peroxide, benzoyl peroxide and di-tertiary butyl peroxide.

The polymerization reaction is carried out, in general at a temperature between about $-30°$ C. and about $150°$ C. When the polymerization reaction is carried out employing a water-suspension type recipe, temperatures between about $0°$ C. and about $75°$ C. are preferably employed. When the polymerization reaction is carried out in the presence of an organic peroxide initiator in a bulk-type polymerization system, temperatures over the entire range of between about $-30°$ C. and about $150°$ C. are employed, and preferably between about $-30°$ C. and about $20°$ C., depending upon the decomposition temperature of the promoter. The polymerization reactions described herein to produce the polymeric compositions of the present invention are carried out under autogenous conditions of pressure although they can be carried out under higher pressures as by introduction of an inert gas such as nitrogen.

As previously indicated, the terpolymers of the present invention are particularly suitable and useful for the fabrication of a wide variety of materials having highly desirable physical and chemical properties. In this respect, the terpolymers of the present invention possess important utility in the fabrication of resilient gaskets, seals, valve-diaphragms, films and various other commercial applications. Another important use of the terpolymers of the present invention, particularly those having relatively lower molecular weights, is in the form of durable, flexible, protective coatings on surfaces which are subjected to distortion in normal use, e.g., fabric surfaces. For these purposes, the terpolymers may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces the molecular weight of the polymeric compositions and increases their solubility, without affecting unduly the overall yield. Suitable polymerization modifiers include chloroform ($CHCl_3$), diethyl malonate, carbon tetrachloride ($CCl_4$), trichloroacetyl chloride ($CCl_3COCl$), bromotrichloromethane ($CBrCl_3$), dodecyl mercaptan ($C_{12}H_{25}SH$) and mixed tertiary mercaptans. These modifiers are preferably added in amounts between about 0.01 and about 10 parts by weight per 100 parts of total monomers charged to the polymerization reaction.

The terpolymers or gum stock of the present invention are readily cross-linked or vulcanized to elastomeric materials using conventional amine or phenolic cure systems known to those skilled in the art.

Particularly preferred are admixtures curable in reactive association with inorganic acid-acceptor, e.g., MgO, to produce a cured elastomer, said admixture comprising 100 parts by weight fluorinated terpolymer of the invention, 0.05 to about 1 part by weight of quaternary phosphonium compound and about 0.1 to about 5 parts by weight of at least one aromatic dihydroxy compound.

Inorganic acid acceptors are used in amounts of 2 to 25 parts by weight per 100 parts of terpolymer and include, in addition to MgO, litharge (PbO), dibasic lead phosphite and zinc oxide. In addition an "optional base" is generally desired as a cure accelerator. These optional bases are basic compounds and include inorganic oxides and hydroxides such as calcium oxide, calcium hydroxide, barium carbonate, strontium hydroxide and the like. The optional bases are preferably used in amounts ranging from 0.5 to 10 parts per 100 parts of terpolymer.

The quaternary phosphonium compounds useful in preparing curable fluoroelastomer compositions are compounds which contain at least one phosphorus atom covalently bonded through carbon-phosphorus single bonds to four organic radicals and, additionally, through an ionic bond to an anion. Such materials, their characteristics and several methods of preparation are described, for example in "Organophosphorus Compounds", G. M. Kosolapoff, (John Wiley and Sons, New York 1950), particularly chapter five. The four organic radicals bonded to each phosphorus atom may be the same or different, and each radical may contain from one to twenty or more carbon atoms, although two to about eight carbon atoms are preferred with a total of not more than about thirty. The carbon skeletal chain of the organic radical may be linear, branched, or cyclic and may be saturated, unsaturated, or aromatic and may contain atoms other than carbon, such as oxygen, nitrogen or sulfur in addition to carbon. The chain may be substituted or unsubstituted, but the substituents, if any, should preferably not be strongly acidic radicals (i.e. radicals derived from an acid having an ionization constant in water at $25°$ C. of at least $10^{-5}$) or a salt thereof (e.g. carboxyl, sulfonic, or phosphonic acid or salts thereof) although active hydrogen in a weakly acidic form, such as an aliphatic hydroxyl radical is acceptably in small amounts, e.g. 0.5% by weight or less of the compound.

Representative quaternary phosphonium compounds include:

$(CH_3)_2(C_2H_5)_2P^+Cl^-$
$(C_2H_5)_3C_{18}H_{37}P^+SO_4H^-$
$(CycloC_6H_{11})_2(C_6H_{13})_2P^+NO_3^-$
$(C_4H_9)_3CH_2=CH-CH_2P^+Cl^-$
$(C_6H_5)_3C_6H_5CH_2P^+CH_3CO_2^-$
$(C_6H_5)_3CH_3OC_2H_5P^+Cl^-$
$(C_8H_{17})_3(CH_3)_2NCH_2CH_2P^+Cl^-$
$(C_8H_{17})_3HOC_2H_5P^+Cl^-$
$Cl^- {}^+P(C_2H_5)_3CH_2CH_2CH_2CH_2(C_2H_5)_3P^+Cl^-$ Quaternary phosphonium compounds having too high a molecular weight diffuse less efficiently through the fluorocarbon polymer during the curing process, thus tending to result in some unevenness in cure and less preferred physical properties in the resulting vulcanizate. A generally satisfactory cure can be obtained most effectively with a compound having a molecular weight of not more than about 1,000 and in most cases a molecular weight of not more than about 500 is preferred. The nature of the anion is not critical and is generally determined by the nature of the reactants used in synthesizing the phosphonium compound. The anion is generally monovalent, but it may also be divalent or polyvalent. Typical anions are choride, bromide, hydroxyl, methoxy, acetate, mercaptate, sulfate, bisulfate and the like. Neutral salts are preferred over acidic or basic phosphonium compounds because of their better stability and easier handling, although it should be recognized that the compounds may be converted to the basic form during compounding, since the vulcanizable composition contains large amounts of relatively strong base, such as magnesium oxide or calcium hydroxide.

In addition to the quaternary phosphonium compounds, it is usually desirable to use co-curatives. Such co-curatives are well known and are described in the literature, for example in U.S. Pat. No. 3,243,411 and 3,502,628. A particularly preferred class described in U.S. Pat. No. 3,655,727 comprises the aromatic hydroxy compounds, that is, nucleophilic compounds in which one or more hydroxyl radicals are bonded through the oxygen atom of the radical to an aromatic nucleus, such as phenyl, naphthyl, and the like. Co-curatives containing two aromatic hydroxyl groups are more particularly preferred. Such co-curatives are described and exemplified, for example in U.S. Pat. No. 3,752,787, as at Col. 3, line 33 to Col. 4, line 35 as di-, tri-, and tetra-hydroxybenzenes, naphthalenes, and

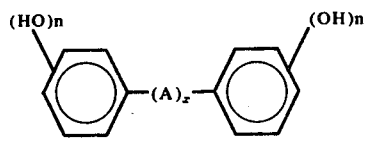

wherein A is a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; $x$ is 0 or 1; $n$ is 1 or 2; and any aromatic ring of the polyhydroxylic compound is optionally substituted with at least one atom of chlorine, fluorine, or bromine. It will be understood from the above bisphenol formula that the —OH groups can be attached in any position (other than number one) in either ring. Blends of two or more such compounds can also be used. One of the most useful compounds is the bisphenol known as Bisphenol AF or BF$_6$ which is hexafluoroisopropylidene-bis(4-hydroxybenzene). The compounds 4,4'-dihydroxydiphenyl sulfone (Bisphenol S) and isopropylidene-bis (4-hydroxybenzene) or Bisphenol A are also considered as very useful bisphenols. Another very useful compound is hydroquinone. Others are illustrated by such dihydroxybenzenes as catechol, resorcinol, 2-methyl resorcinol, 5-methyl resorcinol, 2-methyl hydroquinone, 2,5-dimethyl hydroquinone, and 2-t-butyl hydroquinone.

EXAMPLE 1

A series of polymers is prepared by the following general polymerization technique. A one gallon vertical stainless steel reactor jacketed for temperature control is evacuated and purged twice with nitrogen. It is again evacuated and 2800 gm of deionized water containing 36.4 gm of K$_2$HPO$_4$ buffer is added to maintain a pH of about 6–8. The water-buffer mixture is degassed under vacuum followed by nitrogen purge to remove air and the vessel is again evacuated. The catalyst (2–10 gm of potassium persulfate), and emulsifier (10–12 gm of perfluorooctanoic acid) and chain transfer reagent, such as CCl$_4$ or diethylmalonate, if desired, are added. The reaction mixture is agitated with a horizontal stirrer at 500 – 900 RPM and heated to 55° – 85° C. (130°–180° F) at which time a small precharge of HFP (36–42 gm) and the desired termonomer charge is started and the reactor pressurized from 7 to 14 kg/cm$^2$ (100–200 psig). Batches of these proportions require a total of about 1.1 kg of monomers. The molar proportions are tabulated in Table 1. The desired reaction temperature and pressure are maintained by control of jacket temperature and continuous feed of monomer mixture. After approximately 30% solids is reached (1100 gm of monomer charged) the monomer feed is stopped, the reactor cooled, vented to the atmosphere and discharged. The latex is then coagulated to a white crumb by the addition of sodium chloride (21.0% in water) and dilute H$_2$SO$_4$ (2% by weight in water). The crumb is washed several times with water and dried at 104° C. (220 ° F) for 18 hours. There is obtained 900 to 1000 gm of dry terpolymer.

The samples are analyzed for carbon, hydrogen and chlorine and compositions in mol percent of the three monomers are determined from the analytical results. Inherent viscosities are determined for representative polymers. The results are summarized in Table I.

TABLE I

| Run | Charged (mols) (a) | | | Determined Polymer Composition | | | |
|---|---|---|---|---|---|---|---|
| | VF$_2$ | HFP | CTFE | VF$_2$ | HFP | CTFE | IV(b) |
| 1 | 81 | 19 | 0 | 80 | 20 | 0 | — |
| 2 | 55 | 31 | 13 | 55 | 33 | 12 | 0.365 |
| 3 | 60.2 | 14.9 | 24.9 | 55 | 23 | 22 | 0.362 |
| 4 | 64.5 | 30.5 | 5.0 | 61 | 34 | 5 | 0.42 |
| 5 | 59.7 | 34.8 | 5.5 | 55 | 39 | 6 | 0.43 |
| 6 | 69.2 | 26.2 | 4.8 | 62 | 32 | 6 | 0.48 |
| 7 | 62.4 | 32.1 | 3.6 | 59 | 37 | 4 | 0.43 |
| 8 | 65.5 | 33.5 | 1 | 60 | 39 | 1 | 0.51 |
| 9 | 65.8 | 31.2 | 3 | 64 | 33 | 3 | 0.49 |
| 10(c) | 64.6 | 34.4 | 1 | 61 | 38 | 1 | 0.59 |
| 11 | 64.5 | 35 | 0.5 | 60.5 | 39 | 0.5 | 0.35 |

(a) Exclusive of precharge of HFP
(b) Inherent viscosity; 0.5 g/deciliter in acetone at 30° C.
(c) Material of same composition using diethyl malonate as chain transfer agent IV 0.55.

It will be noted that runs 1 through 3 are for comparative purposes and fall outside the invention. Runs 2 and 3 are illustrative of U.S. Pat. No. 3,053,818 and Run 1 of U.S. Pat. No. 3,051,677. Useful polymers fall in the range of inherent viscosity from 0.01 to 1.2 corresponding to number average molecular weight ($\overline{M}_n$) of about 1,000 to about 1,000,000. For example, Run 8 having inherent viscosity about 0.5 is found by gel permeation chromatography to have $\overline{M}_n$ of about 90,000.

EXAMPLE 2

Each of the series of polymers prepared in Example 1 (hereinafter referred to by Run numbers) is compounded on a water cooled two-roll rubber mill to contain 100 parts gum stock, 3.2 parts of mono sodium salt of 2,2 bis (4-hydroxyphenyl) perfluoropropane ($BF_6$), 0.75 parts of triphenylbenzyl phosphonium chloride (TPBPC1), 30 parts medium thermal carbon black, 6 parts calcium hydroxide and 3 parts magnesium oxide (Maglite D available from Merck Chemical Division of Merck and Co., Inc.).

The mono sodium salt of $BF_6$ is prepared by adding equal molar amounts of sodium methoxide (0.48 gm) to a 50% by weight methanol solution of the $BF_6$ (3.0 gm) and adding TPBPC1 (0.75 gm) to this. The resulting solution is added slowly to the raw gum stock on the mill prior to the addition of carbon black and bases.

The compounded stock is molded as sheets at 175° C. (350° F) for 10 minutes at 35000 kN/m² (5000 psi) removed from the mold and post cured at 260° C (500° F) for 24 hours. Samples are prepared and tested by standard tests. The results are tabulated in Table 2. The moled parts are tested for physical properties as dumbbells according to ASTM Procedure D 412-68 and for heat aged properties according to ASTM D 573-67. The low temperature properties are characterized by the temperature at which there is 10% retraction from a specific elongated condition, designated as TR10, and determined according to ASTM D 1329-60.

For comparative purposes a sample of commercial fluoroelastomer, herein designated CFP, (a terpolymer of about 60–70 mol% $VF_2$, 15–20 mol% HFP and 15–25 mol% TFE believed to be in accordance with U.S. Pat. No. 2,968,649) is also compounded. To 100 parts of gum stock is added 30 parts medium thermal carbon black available as Thermax MT, from R. T. Vanderbilt Co., Inc., 6 parts $Ca(OH)_2$ (analytical reagent grade, available from Mallinckrodt) and 3 parts MgO (Maglite D). The compounded stock is tested in the same manner as polymers prepared in this example.

The test data are tabulated in Table 2 where T is tensile strength at break in kN/m², M is modulus at 100% elongation in kN/m², E is elongation at break in %, SH is Shore Hardness on the A scale. TC is the change in tensile strength after 70 hours in air at 275° C expressed as percent decrease (all values are decreases and are negative) and TR10 is in ° C. below zero (i.e. figures are all negative).

TABLE 2

| Run | T | M | E | SH | TC | TR10 |
|---|---|---|---|---|---|---|
| 1 | 14000 | 5700 | 210 | 75 | 20 | 16 |
| 2 | 7900 | 6100 | 230 | 75 | — | 6 |
| 3 | 9800 | 4900 | 180 | 75 | — | 11 |
| 4 | 13300 | 6300 | 200 | 77 | 36 | 7 |
| 5 | 11300 | 5100 | 220 | 75 | 50 | 8 |
| 6 | 14100 | 7200 | 190 | 78 | 46 | 11 |
| 7 | 13900 | 7900 | 180 | 80 | 36 | 7 |
| 8 | 13200 | 7900 | 180 | 82 | 33 | 6 |
| 9 | 13500 | 6100 | 245 | 78 | 36 | 10 |
| 10 | 13600 | 5700 | 233 | 76 | 29 | 8 |
| 11 | 13600 | 5400 | 245 | 76 | 29 | 2 |

TABLE 2-continued

| Run | T | M | E | SH | TC | TR10 |
|---|---|---|---|---|---|---|
| CFP | 15000 | 6300 | 205 | 79 | 22 | 15 |

EXAMPLE 3

The gum stocks prepared in Runs 1, 3, 4, 5, 6, and 7 are compounded and molded as described in Example 2. Samples for testing tear strength are cut using Die C (ASTM procedure D 624-54) following both press cure and post cure. A comparative sample (CFP) is employed as a control along with Run 1. The tear strengths in kg/cm are tabulated in Table 3.

Table 3

| Run | CFP | 1 | 3 | 4 | 5 | 6 | 7 |
|---|---|---|---|---|---|---|---|
| Press Cure | 18.2 | 15.6 | 23.8 | 23.4 | 25.3 | 18.2 | 19.2 |
| Post Cure | 18.2 | 14.6 | 18.2 | 21.8 | 22.5 | 18.3 | 17.4 |

EXAMPLE 4

The compounded raw gum obtained from Runs 1, 2, 3, 4, 5, 6, 7, 10, and 11 are molded in the form of O-rings using the compound formulation and conditions shown in Example 2. Compression set is measured in duplicate according to ASTM Procedure D 395-69 Method B for 70 hours at 200° C (392° F) 0.353 cm (0.139 inch) O-rings. The results in percent are tabulated in Table 4 (averages).

Table 4

| Run | CFP | 1 | 2 | 3 | 4 | 5 | 6 | 7 | 10 | 11 |
|---|---|---|---|---|---|---|---|---|---|---|
| % | 30 | 16 | 50 | 50 | 25 | 29 | 26 | 24 | 16 | 20 |

EXAMPLE 5

The percent volume swell of the samples of Example 4 is measured in duplicte on slabs according to ASTM Procedure D 471-68 paragraph 9 in toluene for 70 hours at 25° C (74° F) and Stauffer Blend 7700 for 70 hours at 200° C. (392° F). The respective results are tabulated as percent in Table 5 (averages).

Table 5

| Run | CFP | 1 | 2 | 3 | 4 | 5 | 6 | 7 | j10 | 11 |
|---|---|---|---|---|---|---|---|---|---|---|
| Toluene | 8 | 15 | 7 | 18 | 6.5 | 4.8 | 4.4 | 7.5 | 4.6 | 3.0 |
| Stauffer | 12 | 20 | 13 | 26 | 15 | 11.3 | 10.3 | 15.8 | 10.5 | 7.0 |

EXAMPLE 6

The gum stock elastomers of Runs 8 and 9 are compounded on a water cooled two roll rubber mill with the components set forth in Table 6 to illustrate methods of cure. The resulting compounded stock is press cured and post cured under the indicated conditions and the physical properties of molded sheets and O-rings are determined as previously described in Examples 2 and 4. The results are summarized in Table 6.

Table 6

| Run | 8 | 9 |
|---|---|---|
| Cure | | |
| $BF_6$ | — | 2.1 |
| TPBPCl | — | 0.5 |
| HMDAC (a) | 3.0 | — |
| MgO | 15 | 3 |

Table 6-continued

| Run | 8 | 9 |
|---|---|---|
| Ca(OH)$_2$ | 5 | 10 |
| CMT (b) | 30 | 30 |
| Press (minutes at 175° C) | 10 | 10 |
| Post cure ° C | 230 | 260 |
| Hours | 24 | 24 |
| Properties | | |
| Tensile (kN/m$^2$) | 14500 | 12500 |
| Elongation (E in %) | 140 | 295 |
| Modulus (at 100% E) (kN/m$^2$) | 8000 | 4700 |
| Hardness (Shore A) | 82 | 77 |
| Compression Set (as Example 4) | 52 | 37 |

(a) Hexamethylenediamine carbamate
(b) Medium thermal carbon black

Careful analysis of the data of the preceeding Examples shows that the rate and level of cure of the terpolymer system depends of the VF$_2$ content. At least about 55 mol percent must be VF$_2$ or satisfactory curing characteristics are difficult to obtain, and somewhat higher content of VF$_2$ is preferred. With terpolymer containing 55-60 mol% VF$_2$, the physical characteristics are quite sensitive to CTFE content. As little as 1 mol% CTFE provides a significant improvement in low-temperature flexibility, the TR10 being about −6° to −8° C (Runs 8, 10). The TR10 falls to about −8 to −10 at about 3 mol% CTFE; further increase to 10 mol% CTFE or more does not greatly improve low temperture flexibility.

At 1 mol% CTFE, the volume swell of the terpolymer in toluene is less than 5%. The swell slowly increases with CTFE content at constant VF$_2$ content, but is still less than 5% at 5 mol%. Above about 8 mol% CTFE (6% volume swell) volume swell increases rapidly.

What is claimed is:
1. A fluorinated terpolymer curable to a fluid resistant elastomer consisting essentially of 55 to 70 mol percent vinylidene fluoride, 25 to 40 mol percent hexafluoropropene and 1 to 8 mol percent chlorotrifluoroethylene to a total of 100 mol percent.
2. An admixture curable in reactive association with an elastomer, acid-acceptor to produce a cured elatomer, said admixture comprising:
   a. 100 parts by weight fluorinated terpolymer according to claim 1,
   b. 0.05 to about 1 part by weight of quaternary phosphonium compound, and
   c. about 0.1 to about 5 parts by weight of at least one aromatic hydroxy compound.
3. The fluorinated terpolymer according to claim 1 consisting essentially of 55-65 mol percent vinylidene fluoride, 30-40 mol percent hexafluoropropene and 1 to 5 mol percent of chlorotrifluoroethylene.
4. A fluorinated terpolymer according to claim 1 vulcanized to a thermally stable, fluid resistant fluoroelastomeric material.
5. Manufactured shaped article consisting essentially of the thermally stable, fluid resistant fluoroelastomeric material of claim 4.

* * * * *

UNITED STATES PATENT AND TRADEMARK OFFICE
CERTIFICATE OF CORRECTION

PATENT NO. : 4,032,699
DATED : June 28, 1977
INVENTOR(S) : Arthur C. West, III

It is certified that error appears in the above-identified patent and that said Letters Patent are hereby corrected as shown below:

Column 1, line 36, "elevted" should read -- elevated -- .

Column 5, line 23, "choride" should read -- chloride -- .

Column 8, line 48, "j10" should read -- 10 -- .

Column 9, line 18, "of" should read -- on -- .

Column 10, line 11, "elastomer," should read -- inorganic -- .

Signed and Sealed this

Twenty-second Day of January 1980

[SEAL]

Attest:

SIDNEY A. DIAMOND

Attesting Officer  Commissioner of Patents and Trademarks